United States Patent [19]

Groff

[11] 4,014,581
[45] Mar. 29, 1977

[54] SHOE ASSEMBLY
[75] Inventor: Eugene R. Groff, Chillicothe, Ill.
[73] Assignee: Caterpillar Tractor Co., Peoria, Ill.
[22] Filed: Oct. 14, 1975
[21] Appl. No.: 622,204
[52] U.S. Cl. .............................................. 305/54
[51] Int. Cl.² ...................................... B62D 55/28
[58] Field of Search ............ 305/46, 54; 74/243 R, 74/229, 247

[56] References Cited
UNITED STATES PATENTS

| | | | |
|---|---|---|---|
| 1,765,580 | 6/1930 | Haggart | 305/46 |
| 3,762,780 | 10/1973 | Tomizawa | 305/46 |
| 3,916,708 | 11/1975 | Durand | 74/243 R |

Primary Examiner—Robert B. Reeves
Assistant Examiner—John P. Shannon
Attorney, Agent, or Firm—Frank L. Hart

[57] ABSTRACT

A shoe assembly of a continuous track of a crawler type vehicle has a vibration damping assembly substantially covering a surface of the shoe to damp shoe vibrations. The vibration damping assembly has at least one plate extending over the surface of the shoe and a viscoelastic material positioned between said shoe and plate for connecting the plate to the shoe.

8 Claims, 6 Drawing Figures

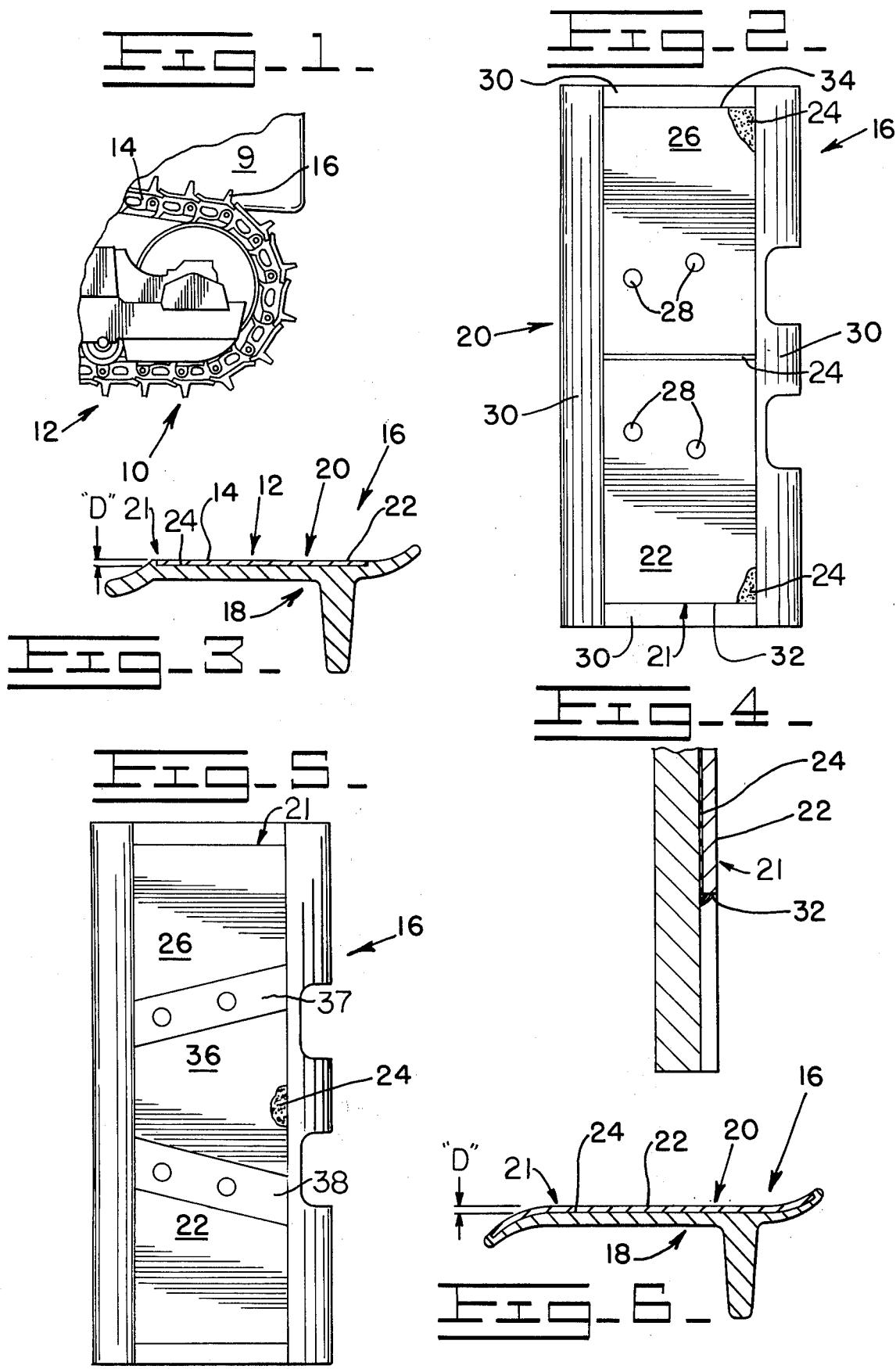

SHOE ASSEMBLY

BACKGROUND OF THE INVENTION

In the operation of crawler type vehicles, the noise level emitted from the rotating track is often objectionable. This is particularly true where such vehicles are used in construction adjacent an apartment complex, office building or other locations where a large number of people could be disturbed by the noise.

This noise is emitted from driving forces being subjected onto the track and from impacts by objects on the track. One of the principal sites of noise emission is from the shoes of the track. Sound waves readily travel outwardly from the relatively broad surfaces of the shoes. Further, the shoes are of a configuration which sometimes reaches resonance frequency which functions to increase the objectionable noise.

Heretofore, buffer means such as shown in U.S. Pat. No. 3,762,780 which issued Oct. 2, 1973 to K. Tomizawa from an application filed May 25, 1971, functioned to reduce the noise from the track. However, the configuration of the buffer means did not desirably eliminate the noise and were relatively ineffective in reducing noise responsive to impacts on the shoe.

This invention therefore resides in an improved shoe assembly which functions to retard vibrations across substantially the entire surface of the shoe.

BRIEF DESCRIPTION OF THE DRAWINGS

FIG. 1 is a diagrammatic view of a portion of a track assembly;

FIG. 2 is a diagrammatic plan view of the second surface of a shoe assembly having the elements of this invention;

FIG. 3 is a diagrammatic sectional end view of the shoe assembly;

FIG. 4 is a diagrammatic sectional view of portions of the plates and shoe;

FIG. 5 is a diagrammatic plan view of another embodiment of the shoe assembly of this invention; and FIG. 6 is a diagrammatic sectional end view of another embodiment of the shoe assembly of this invention.

DETAILED DESCRIPTION OF THE INVENTION

Referring to FIG. 1, a crawler type vehicle 9 has a continuous track 10 formed of a plurality of shoe assemblies 12 connected one to the other through links 14 for forming a continuous track, as is known in the art.

Referring to FIGS. 2 and 3, each shoe assembly 12 has a shoe 16 which has a ground contacting surface 18 (FIG. 3) and an opposed second surface 20.

The improved shoe 16 of this invention has a vibration damping assembly 21 connected to and substantially covering the second surface 20 of the shoe 16. The vibration damping assembly 21 has at least one constraining plate 22, preferably a plurality of constraining plates 22,26 extending over said second surface 20 with a viscoelastic material 24 positioned between the plate or plates 22,26 and being bonded to the second surface 20 of the shoe 16 and to the plate or plates 22,26 for connecting said plates to the shoe 16.

In the embodiment of FIGS. 2 and 3, a first constraining plate 22 is positioned adjacent the second surface 20 of the shoe 16, extends over a preselected portion of the shoe 16, and is connected to the second surface 20 of the shoe 16 by an intervening layer of viscoelastic material 24. A second constraining plate 26 is positioned adjacent the second surface 20 of the shoe 16, spaced from the first plate 22, extends over another preselected portion of the shoe 16, and is connected to the second surface 20 of the shoe 16 by the intervening viscoelastic material 24.

By the term viscoelastic material as used herein, it is meant material that is capable of being bonded to steel and which has the properties of being viscous and elastic and of the type identified as Dow-Corning DC 271 which is a silicon base material manufactured by the Dow-Corning Corporation of Saginaw Road, Midland, Mich. 48640.

As better seen in FIG. 2, the first and second plates 22,26 are spaced one from the other along a plane generally separating the shoe 16 into first and second substantially equal halves. The shoe is generally elongated and the adjacent edges of the plates 22,26 are of a lesser dimension than the length of each plate. However, the plates 22,26 can be oriented differently relative one to the other without departing from this invention, as hereinafter more fully described.

Openings 28 extend through the first and second plates 22,26 and are coaxially aligned with corresponding openings through the shoe 16 in the installed position on the plates 22,26. Fastening means such as bolts (not shown) are extendable through the openings 28 for connecting links 14 (see FIG. 1) to the shoes for forming the continuous track 10.

In order to protect the viscoelastic material 24 and the constraining plates 22,26 from damage, the preselected portions of the shoe covered by the plates 22,26 are preferably encompassed by a shoe edge portion 30. FIGS. 2 and 3 show one embodiment of the apparatus having an edge portion 30 about the vibration damping assembly 21. FIG. 6 shows a preferred embodiment wherein the vibration damping assembly 21 extends to substantially the lip edge of the shoe 12.

Referring to FIGS. 3 and 6, the portions of the second surface 20 of the shoe 16 covered by the plates 22,26 are preferably depressed a distance D relative to the edge portions 30 of the shoe 16 for further protecting the vibration damping assembly 21.

The outer ends 32,34 of the respective plates 22,26 are preferably welded to the shoe 16, as better seen in FIG. 4, to prevent damage to the bond of the viscoelastic material 24.

Referring to FIG. 5, first and second plates 22,26 of different configuration are bonded to the shoe 16 by the viscoelastic material 24 as set forth above. In this embodiment, the first and second plates 22,26 are laterally spaced from one another by first and second intervening preselected areas 37,38 for attaching links 14 to the shoe 16. Here, a third plate 36 is positioned between the first and second areas 37,38 and the first and second plates 22,26 and bonded to the shoe 16 by viscoelastic material 24 as set forth above. It is preferred in this embodiment of FIG. 5 that both the vibration damping assembly 21 and the links 14 be positioned in a depressed portion of the shoe 16.

Referring to FIG. 4, one portion of each plate is fixed directly to the shoe 16 and another portion of each plate is fixed only to the associated viscoelastic material 24 which in turn is fixed to the shoe 16. The plates can be fixed directly to the shoe by welding, for example, along one edge of the shoe 16.

By this construction, the welded portion assures that the plates 22,26,36 are maintained with the shoe 16 and the shoe and plates are sufficiently free to deflect in a relative manner sufficient to place shear forces in the viscoelastic material 24. If all edges of the plates 22,26,32 were fixedly connected to the shoe they would not be deflected differently relative one to the other and forces on the viscoelastic material 24 from the shoe 16 would substantially be generally compression or tensile forces as opposed to shear forces which function to dissipate and absorb the forces. The spacing of the plates 22,26,32 also assures that adjacent plates do not contact one another or adjacent structure which would would restrain the movement of the plates and the desired shear forces in the viscoelastic material 24.

By so constructing the shoe assembly, deflection forces on the shoe are transmitted into the viscoelastic material 24 where they are changed to shear forces and dissipate and are absorbed by the viscoelastic material. The vibrations of the shoe 16 are thereby quickly and efficiently damped. Further, the construction provides apparatus for damping substantially all portions of the shoe while protecting the damping material from damage and without detrimentally altering the weight and strength of the shoe.

Other aspects, objects and advantages will become apparent from a study of the drawings, the disclosure, and the appended claims.

What is claimed is:

1. In a shoe of a continuous track of a crawler type vehicle, the improvement comprising:
 a vibration damping assembly substantially covering a surface of the shoe, said vibration damping assembly having at least first and second laterally spaced apart plates extending over said surface of the shoe and a viscoelastic material positioned between and being bonded to said surface of the shoe and said plates for connecting the plates to the shoe, said first and second plates being separated one from the other by first and second intervening preselected areas for attaching links to the shoe.

2. Apparatus, as set forth in claim 1, wherein the vibration damping assembly has first and second plates spaced one from the other along a plane generally separating the shoe into first and second substantially equal halves.

3. Apparatus, as set forth in claim 1, wherein the preselected portions of the shoe covered by the plates are encompassed by a shoe edge portion.

4. Apparatus, as set forth in claim 1, including a third plate positioned between said first and second preselected areas.

5. Apparatus, as set forth in claim 1, wherein the portions of the shoe covered by the plates are depressed relative to other portions of said surface of the shoe.

6. Apparatus, as set forth in claim 5, wherein preselected areas for attaching links to the shoe are depressed relative to other portions of said surface of the shoe.

7. Apparatus, as set forth in claim 1, wherein one portion of each plate is fixed to the shoe and another portion of each plate is fixed only to associated viscoelastic material.

8. Apparatus, as set forth in claim 7, wherein the portion of each plate fixed to the shoe is welded to said shoe.

* * * * *